United States Patent [19]

Kishimoto

[11] Patent Number: 5,063,534

[45] Date of Patent: Nov. 5, 1991

[54] ELECTRONIC TRANSLATOR CAPABLE OF PRODUCING A SENTENCE BY USING AN ENTERED WORD AS A KEY WORD

[75] Inventor: Juji Kishimoto, Yokohama, Japan

[73] Assignee: Canon Kabushiki Kaisha, Tokyo, Japan

[21] Appl. No.: 420,730

[22] Filed: Oct. 12, 1989

Related U.S. Application Data

[63] Continuation of Ser. No. 917,249, Oct. 8, 1986, abandoned, which is a continuation of Ser. No. 778,272, Sep. 12, 1985, abandoned, which is a continuation of Ser. No. 707,165, Feb. 28, 1985, abandoned, which is a continuation of Ser. No. 294,862, Sep. 1, 1981, abandoned.

[30] Foreign Application Priority Data

Sep. 8, 1980 [JP] Japan ................ 55-123484

[51] Int. Cl.$^5$ .................. G06F 15/38; G06G 7/60
[52] U.S. Cl. ..................... 364/419; 364/419; 364/920.4; 364/964; 364/928; 364/927.2; 364/DIG. 2
[58] Field of Search ............... 364/200, 900, 419

[56] References Cited

U.S. PATENT DOCUMENTS

| | | | |
|---|---|---|---|
| 3,932,859 | 1/1976 | Kyriakides et al. | 364/900 |
| 4,158,236 | 6/1979 | Levy | 364/900 |
| 4,159,536 | 6/1979 | Kehoe et al. | 364/900 |
| 4,328,562 | 5/1982 | Hashimoto et al. | 364/900 |
| 4,339,806 | 7/1982 | Yoshida | 364/900 |
| 4,383,306 | 5/1983 | Morimoto et al. | 364/900 |
| 4,412,305 | 10/1983 | Yoshida | 364/900 |
| 4,417,319 | 11/1983 | Morimoto et al. | 364/900 |
| 4,438,505 | 3/1984 | Morimoto | 364/900 |
| 4,467,446 | 8/1984 | Sakurai | 364/900 |
| 4,468,754 | 8/1984 | Asada et al. | 364/900 |
| 4,481,607 | 11/1984 | Kobayashi | 364/900 |
| 4,509,137 | 4/1985 | Yoshida | 364/900 |
| 4,541,069 | 9/1985 | Kanou et al. | 364/900 |
| 4,551,818 | 11/1985 | Ichiro Sado et al. | |
| 4,567,573 | 1/1986 | Hashimoto | 364/900 |
| 4,584,667 | 4/1986 | Hashimoto | 364/900 |
| 4,597,055 | 6/1986 | Hashimoto et al. | 364/900 |
| 4,623,985 | 11/1986 | Yanagiuchi | 364/900 |
| 4,733,368 | 3/1988 | Morimoto et al. | 364/900 |
| 4,748,589 | 5/1988 | Kanou et al. | 364/900 |

FOREIGN PATENT DOCUMENTS

| | | |
|---|---|---|
| 2729809 | 7/1977 | Fed. Rep. of Germany . |
| 3042508 | 5/1981 | Fed. Rep. of Germany . |
| 54-11164 | 8/1980 | Japan . |
| 55-103675 | 8/1980 | Japan . |
| 2014765 | 8/1979 | United Kingdom . |

OTHER PUBLICATIONS

*Scientific American*, "Language Translator", Feb. 1979, pp. 4–5.
*Popular Science*, "Hand-Held Language Translator", Apr. 1979, p. 81.
J. McDaniel et al., *Machine Translation*, Oct. 16, 1969, pp. 230–266.

*Primary Examiner*—Gareth D. Shaw
*Assistant Examiner*—Kevin Kriess
*Attorney, Agent, or Firm*—Fitzpatrick, Cella, Harper & Scinto

[57] ABSTRACT

An electronic translating unit has switches for inputting a first language or a second language; a memory consisting of a first memory section for storing words of said first language and addresses of sentences associated with said words, a second memory section for storing words of said second language and addresses of sentences associated with said words, and a third memory section for storing said sentences of said first language and said sentences of said second language corresponding thereto; and access controlling device for accessing, upon input of words of one of said languages, words of the other, said language corresponding thereto, and said addresses of said sentences in either of said languages from said memory, sentence selecting device for accessing and selecting said sentences from said third memory section according to said addresses, and display for displaying said sentences.

6 Claims, 6 Drawing Sheets

| α | β | γ | Σ |
|---|---|---|---|
| 1 | — | 256 | イマナンジデスカ<br>WHAT TIME IS IT NOW ? |
| 1 | 101 | 201 | イッキシャク シュッパツ シマスカ<br>WHAT TIME DOES THE TRAIN LEAVE ? |
| 1 | 101 | 202 | イツ キシャク トウチャク シマスカ<br>WHAT TIME DOES THE TRAIN ARRIVE AT ? |
| 1 | 102 | 201 | イツ ヒコウキク シュッパツ シマスカ<br>WHAT TIME DOES THE AIRPLANE LEAVE ? |
| — | — | — | |
| 1 | 110 | 210 | チェック アウト タイムワ イツデスカ<br>WOULD YOU TELL ME YOUR CHECK OUT TIME ? |

FIG. 4C

ELECTRONIC TRANSLATOR CAPABLE OF PRODUCING A SENTENCE BY USING AN ENTERED WORD AS A KEY WORD

This application is a continuation of application Ser. No. 917,249, filed Oct. 8, 1986, now abandoned, which is a continuation of application Ser. No. 778,272, filed Sept. 12, 1985, now abandoned, which is a continuation of application Ser. No. 707,165, filed Feb. 28, 1985, now abandoned, which is a continuation of application Ser. No. 294,862, filed Sept. 1, 1981, now abandoned.

BACKGROUND OF THE INVENTION

1. Field of the Invention

The present invention relates to an electronic translating unit capable of translating sentences of different languages and, more particularly, to an electronic translating unit which is capable of searching without delay a translated sentence containing a plurality of selected words.

2. Description of the Prior Art

Prior art portable electronic translating units generally translate between words of different languages. Therefore, in order to form a translated sentence, select keys [A] to [Z] or [0] to [9], for example, are assigned to particular sentences. A translated sentence, for example, "I want..." may be formed and displayed by combining these select keys, for example, keys [A] and [A]. This type of electronic translating unit has thus been extremely inconvenient for a traveller in a foreign country since he or she must be well acquainted with the combinations of the select keys for operation purposes. The electronic translating unit of this type has thus been practically unusable.

SUMMARY OF THE INVENTION

It is an object of the present invention to provide an electronic translating unit which may be operated with a simple procedure by a traveller in a foreign country, for example, and which is capable of searching for a desired sentence and its translated equivalent.

It is another object of the present invention to provide an electronic translating unit which sequentially accesses and displays, upon input of a word, sentences which are associated with the input word and which are stored in advance, so that a desired sentence and its translated equivalent may be searched for.

It is another object of the present invention to provide an electronic translating unit which displays, upon inputting a plurality of desired words, sentences including these input words so that a desired sentence and its translated equivalent may be searched for without delay.

The above and other objects of the present invention will become apparent from the following description of the preferred embodiment of the present invention when taken in conjunction with the accompanying drawings.

DESCRIPTION OF THE PREFERRED EMBODIMENTS

The present invention will now be described in more detail referring to the accompanying drawings.

Figure 1:
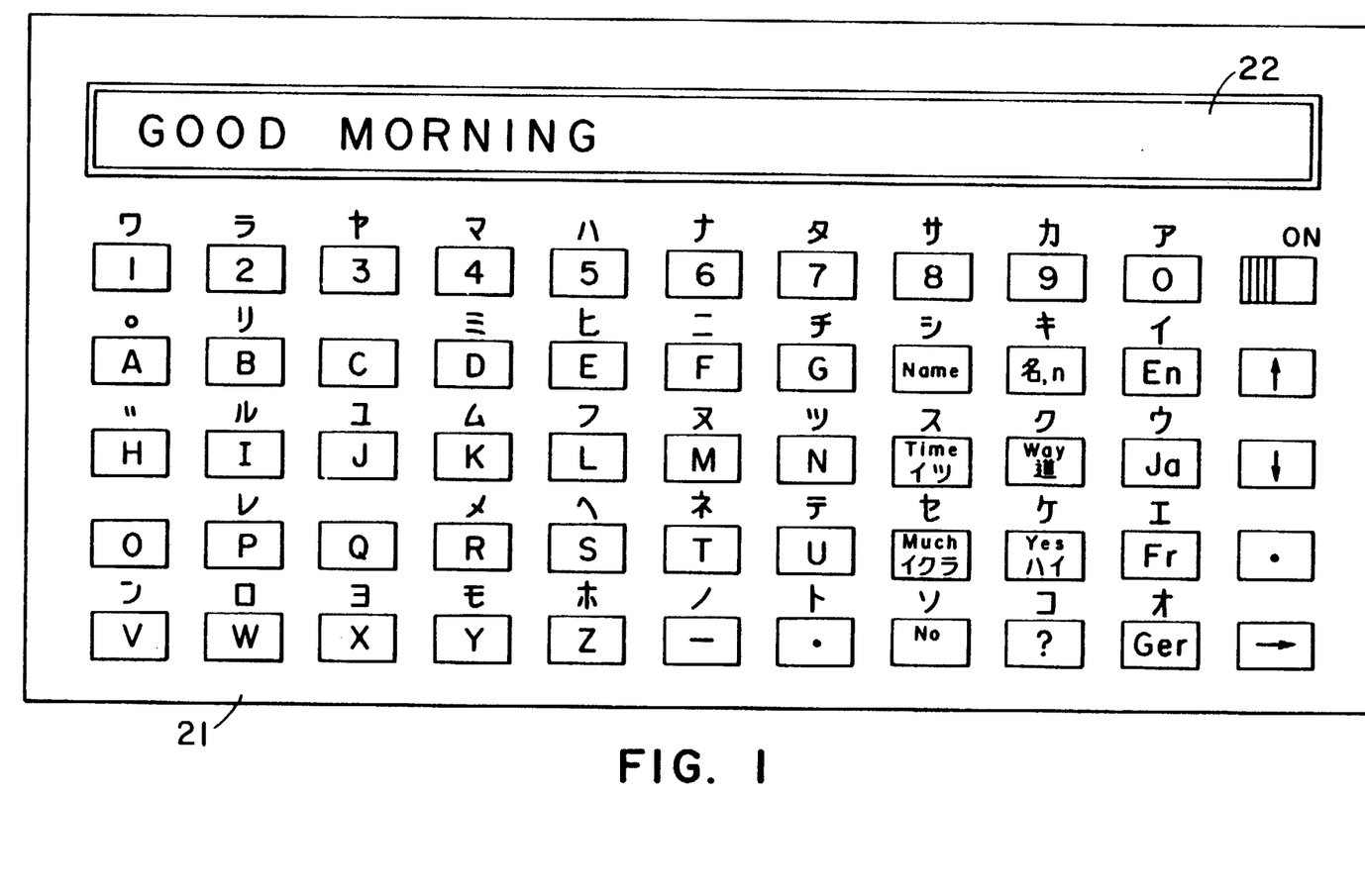
FIG. 1 is a top view showing an example of the arrangement of a control panel of an electronic translating unit according to the present invention.

An example of the arrangement of a control panel of an electronic translating unit according to the present invention is shown in FIG. 1. The control panel shown in FIG. 1 has a keyboard 21 with character keys for selection and input of letters, kana or the like by a key operation to be described later, and function keys for controlling translating operations of various kinds; and a display 22 which has liquid crystal display elements of dot type, for example, to display a sentence consisting of a number of characters. The functions of the function keys on the keyboard shown in FIG. 1 are as follow:

| | |
|---|---|
| [↑] | to make each key function as a key of the character such as kana indicated above the frame of the key. |
| [↓] | to make each key function as a key of the letter, numeral or the like indicated within the frame of the key. |
| [·] | to separate words or numerals. For example, to separate "12" from "36" as in "12·36". |
| [→] | to sequentially display words or sentences for the purpose of search. |
| [En] | to designate translation into an English word or an English sentence. |
| [Ja] | to designate translation into a Japanese word or a Japanese sentence. |
| [Fr] | to designate translation into a French word or a French sentence. |
| [Ger] | to designate translation into a German word or a German sentence. |
| Name 名 | to designate input of a proper noun. |
| Time (イツ) | to designate input of a time. |
| Way (ミチ) | to designate input of a way. |
| Much (イクラ) | to designate input of amount, price, etc. |
| Yes (ハイ) | to designate a positive response upon a single operation. |
| No (イイエ) | to designate a negative response upon a single operation. |

According to this arrangement, words which are frequently used in general conversation may be input by a single key operation in order to save the trouble of correctly spelling these words each time.

Figure 2:
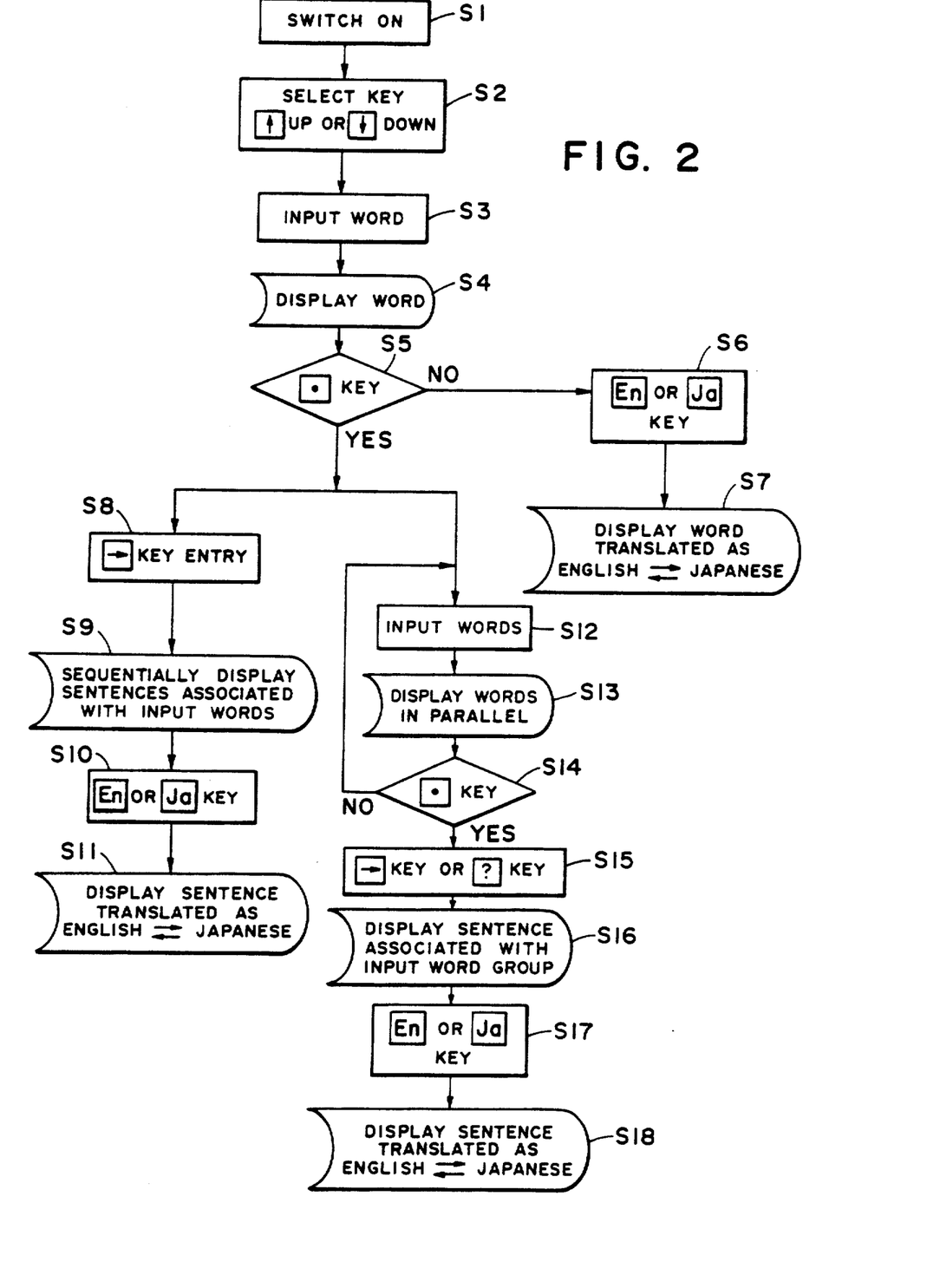
FIG. 2 is a flow chart showing the translating mode of the unit shown in FIG. 1.

The mode of operation of the electronic translating unit of the present invention will now be described with reference to the flow chart shown in FIG. 2, with the operation of the control panel assuming that translation is to be made from Japanese into English.

When the power switch at the upper right corner of the keyboard 21 is turned on (S1), the electronic translating unit may be operated. When the key " [↑] " below the power switch is depressed (S2), the respective keys will function as kana keys (indicated above each key) thereafter. When the kana keys are depressed for "エキ

" (station) (S3) for translation of this word into an English word as a Japanese to English dictionary, the display displays " エキ " in Japanese (S4). The key [↑] is then depressed so that each key may now function as a key of the character within the frame. Upon depression of the key [En] (S6), an English word "station" corresponding to " エキ " is displayed (S7) at the display 22. The electronic translating unit thus functions as a Japanese to English dictionary.

In order to search for an English sentence including a particular word with the electronic translating unit shown in FIG. 1, the key [↑] is depressed while " エキ " is displayed (S4). When keys [·] and [⇥] are depressed next (S5 and S8), examples of Japanese sentences associated with " エキ " are first sequentially displayed (S9):

" エキワドコデスカ " (Where is the station?)
" キァプワトコデウッテイマスカ " (Where can I purchase the ticket?)
" ○○○ユキワッンバンセンデスカ " (Which platform does the train for . . . leave?)
" イツキシャワシュッパツシマスカ " (What time does the train leave?)
" イツキシャワツキマスカ " (What time does the train arrive?)

When the operator depresses the key [En] (S10) when the desired Japanese sentence is displayed, the English sentence corresponding to the displayed Japanese sentence is displayed at the display 22. When the key is depressed for translation of " イツキシャハシュッパツシマスカ ", "What time does the train leave?" is displayed (S11).

However, if the sentences associated with " エキ ", for example, are too numerous, the search for the desired English sentence may become very cumbersome. In order to prevent this problem, with the electronic translating unit of the present invention, a plurality of desired words are simultaneously input to allow search of sentences associated with all of these input words. In the example described above, the key [·] is depressed (S5) while " エキ " is displayed (S4). Additionally, the word " イツ " (when) or " ジカン " (time) associated with time is input as a key word (S12). In this embodiment, up to three key words may be input and the key [·] is depressed every time a key word is input. For example, after operating keys for inputting " エキ ", the key [·], keys for inputting " イツ ", the key [·], keys for inputting " シュッパツ ", and the key [·], the key [↑] is depressed to return the function of each key to that within the frame of the key and key [?] is depressed (S15). Then, the Japanese sentence " イツキシャフシュッパツシマスカ " is immediately displayed (S16). In the manner as described earlier, when the key [En] is then depressed (S17), the English sentence "What time does the train leave?" corresponding to the Japanese sentence is displayed at the display 22.

Figure 3:
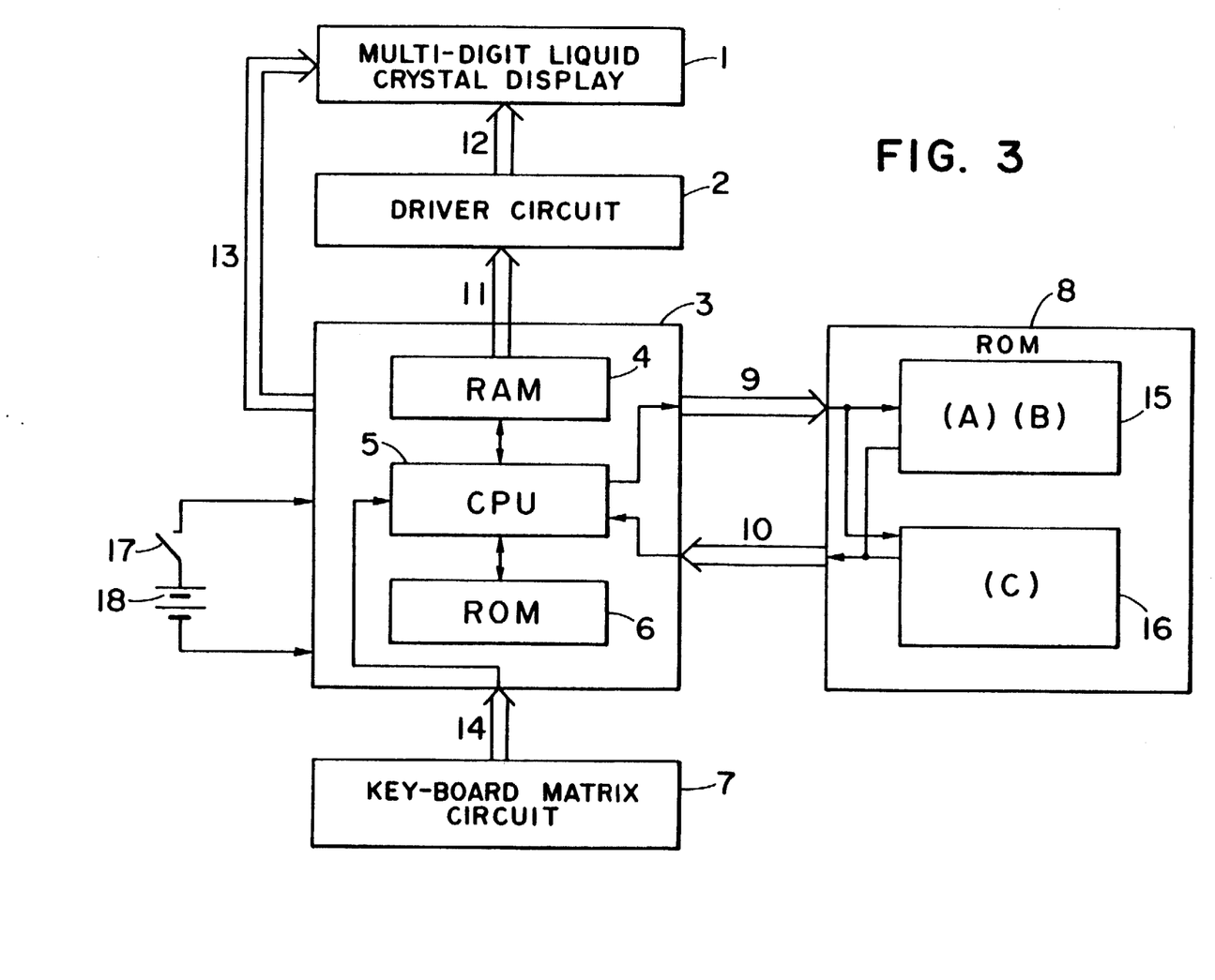
FIG. 3 is a block diagram showing the circuitry of the unit shown in FIG. 1

An example of the circuit configuration of the electronic translation unit operated by the key operations as described above is shown in FIG. 3. In FIG. 3, reference numeral 1 denotes a multi-digit liquid crystal display of dot type and 2 denotes a driver circuit for the liquid crystal display. Reference numeral 3 denotes a semiconductor circuit which serves as access controlling means comprising a random access memory (RAM) 4, a central processing unit (CPU) 5, and a read-only memory (ROM) 6. The RAM 4 is a temporary memory circuit which stores necessary data such as data input by the key operations, data from a read-only memory semiconductor circuit 8 to be described hereinafter, and data to be displayed at the display 22. The CPU controls data transfer, data processing, data comparison and so on of the overall electronic translating unit. The ROM 6 stores in advance the control data for commanding the control operation of the CPU 5.

Figure 4A:
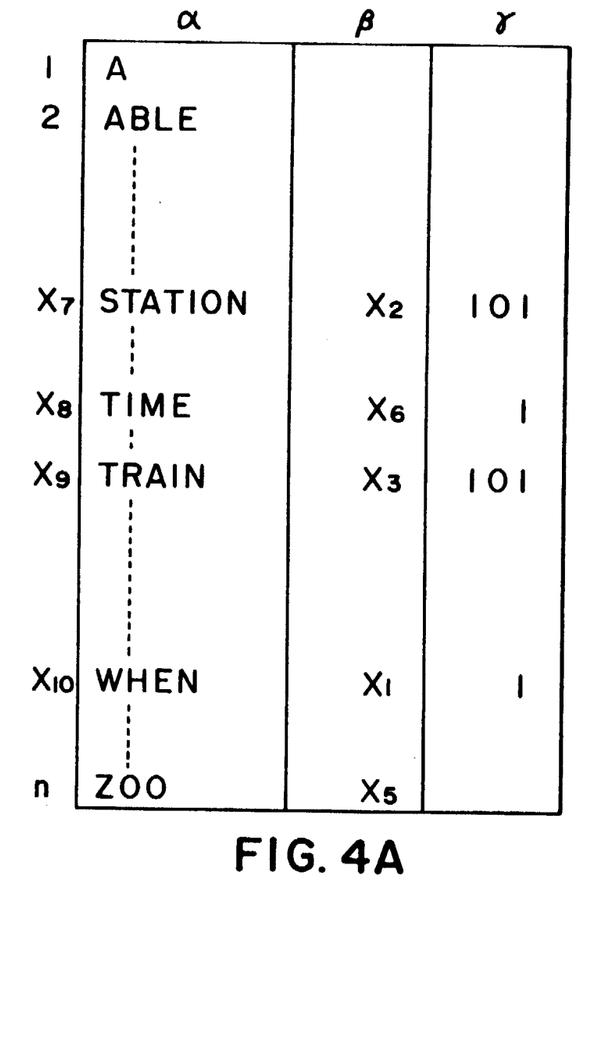
FIGS. 4A through 4C are diagrams showing how words and sentences are stored in the respective memory circuits of the unit shown in FIG. 1.
Figure 4B:
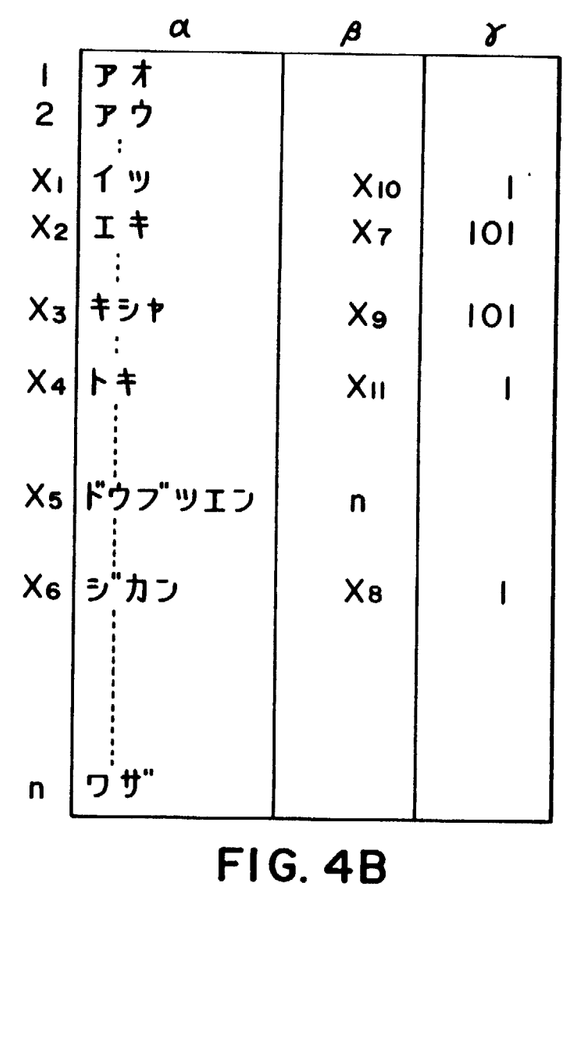
Figure 4C:
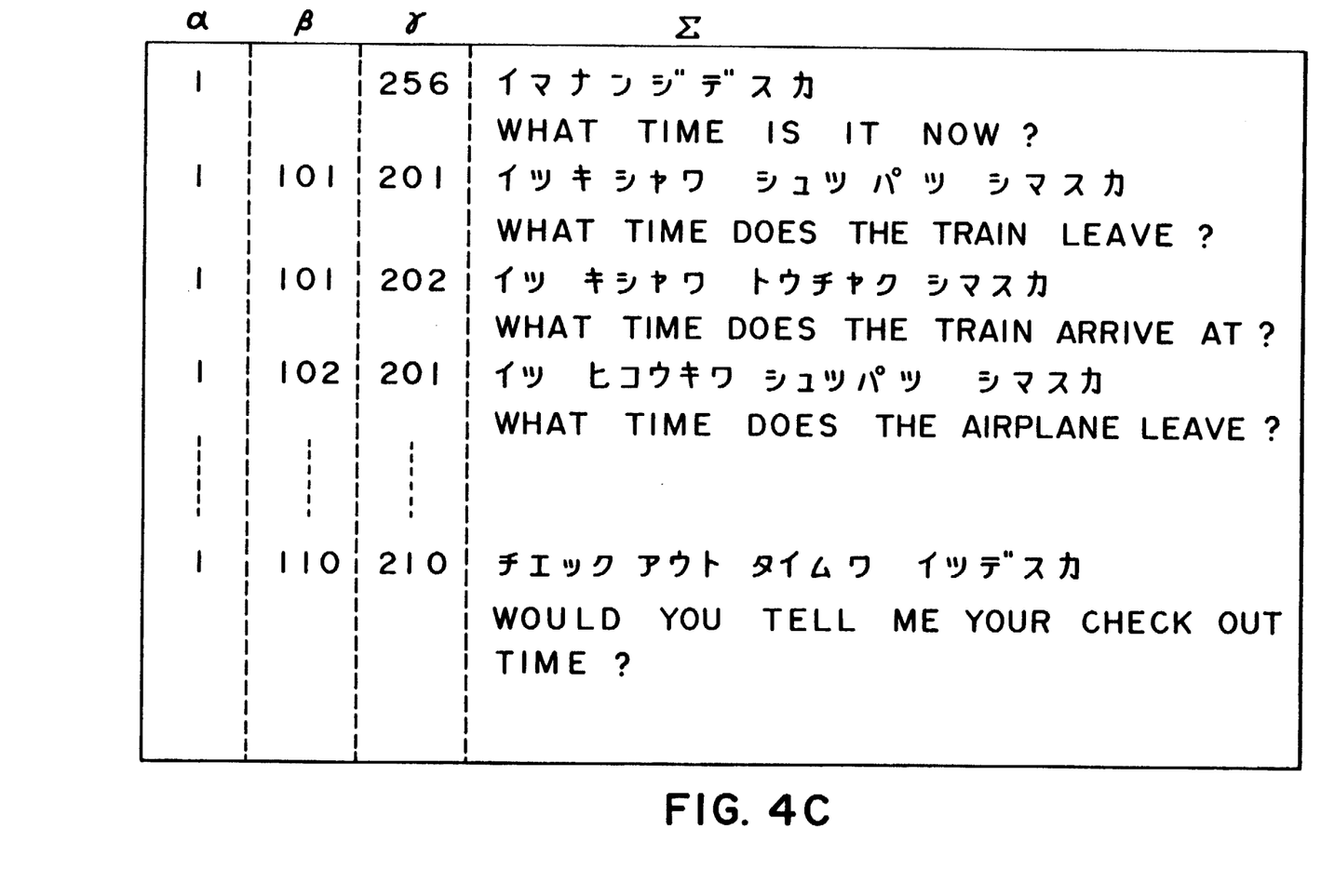

Reference numeral 7 denotes a keyboard matrix circuit which serves as a data input device and as a sentence selection and translation instruction means (see below), comprising keys as shown in FIG. 1. Reference numeral 8 denotes the read-only memory semiconductor circuit which stores, in advance, words of a foreign language; for example, English words, Japanese words, and examples of sentences of both languages. Connecting wires 9 to 14 connect the respective elements of the circuit. Reference numeral 15 denotes a semiconductor circuit which is to be described hereinafter and is shown in FIGS. 4A and 4B; it is a word memory circuit which stores with indices Japanese words and words of a foreign language, for example, English words. Reference numeral 16 denotes a semiconductor circuit which is shown in FIG. 4C and which stores examples of English and Japanese sentences in correspondence with each other; it is a sentence memory circuit. Reference numeral 17 denotes a power switch and 18 denotes a small, built-in type battery.

The electronic translation unit, with the respective parts as described above and shown in FIG. 3, operates in the manner to be described below.

When the power switch 17 is turned on, the electronic translation unit may be operated. When the keyboard matrix circuit 7 operates as described above upon operation of the keyboard on the control panel, the input data selected by the key operations is stored in the temporary memory circuit 4. Code signals are assigned to the letter keys, kana keys, and function keys arranged on the keyboard. For example, binary code signals are assigned as

| | |
|---|---|
| A | 00001 |
| B | 00010 |
| C | 00011 |
| ... | ... | and so on up to "Z"; and further binary code signals are assigned as

| | |
|---|---|
| ア | 100001 |
| イ | 100010 |
| ウ | 100011 |
| ... | ... | and so on up to " ン "

Therefore, when " エキ " is input by the key operations, binary code signals
 100100 for " エ " and
 100111 for " キ "
are stored in the temporary memory circuit (RAM) 4.

Figure 3A:
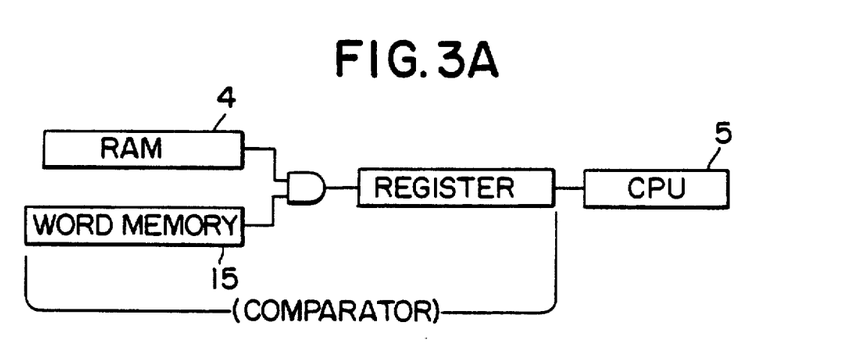
FIG. 3A is a block diagram of the comparator of the present invention.

On the other hand, the binary code signals "100100" and "100111" corresponding to the kana " エ " and " キ " are similarly stored in the read-only memory semiconductor circuit 8. From the time a function key such as [·] or [En] is depressed, the central processing unit (CPU) 5 starts comparing the contents in the temporary memory circuit 4 with the contents as shown in FIG. 4B in the word memory circuit 15. Various measures may be taken to shorten the period of time required for such a comparison. However, describing the basic configuration of the comparing means, as shown in FIG. 4B, a series of words starting with " ア*  " are supplied to the central processing unit 5. The data from the temporary memory circuit (RAM) 4 and the data from the word memory circuit 15 are supplied to an AND gate, the output of which is written in a register, as shown in FIG. 3A. The comparator thus sequentially detects the coincidence of both data. When the coincidence is detected for the binary code signals "100100" and "100111" corresponding to " エ* " with every digit coinciding, an address X7 stored in item β in FIG. 4B corresponding to the Japanese word " エ* " which in turn corresponds to this combination of binary code signals is read out from the word memory circuit 15 to indicate the address of the corresponding foreign word. This address is written in the temporary memory (RAM) 4. Simultaneously with this, an address 101 read out from item γ in FIG. 4B which stores the sentence associated with this word is written in the temporary memory circuit (RAM) 4.

If the function key which has been depressed is the key [En], the series of binary code signals corresponding to the English word "station" at the address X7 which is written in the temporary memory circuit (RAM) 4 in this manner is written in the temporary memory circuit (RAM) 4 through the central processing unit (CPU) 5 and is then supplied to the display 1. The series of binary code signals representing the English word is decoded into a series of character signals which is supplied to the display 1 for display of the English word "station". Thus, the translation operation in response to the depression of the key [En] is completed.

On the other hand, if the key [·] as the function key is depressed after " エ* " is input by the operation of the keyboard, the address X7 of the foreign word and the address 101 of the sentence associated with this word are read out from the read-only memory semiconductor circuit 8 and the unit holds this condition until the next kana key or key [⊟] for searching sentences is depressed. Each time the key [⊟] is subsequently depressed, according to the address 101 of the associated sentences which is stored in the temporary memory circuit (RAM) 4, sentences corresponding to "101" which in turn corresponds to " エ* " in item β in FIG. 4C are sequentially written, through the central processing unit (CPU) 5, in the temporary memory circuit (RAM) 4 in the order stored at this address from the sentence memory circuit 16 storing the sentences in the form shown in FIG. 4C. Then, in the same manner described above, the series of binary code signals are sequentially decoded into sentences and displayed at the display 1. When the key [En] is depressed as the desired sentence is displayed during this search procedure, the English sentence corresponding to the selected sentence is decoded and displayed in a similar manner.

When the key [·] is depressed after the input of the word " エ* " and then another word is input by depression of kana keys, the data associated with " エ* " described above, that is, the address X7 of the corresponding English word and the addresses 101 of the sentences associated therewith are all written from the word memory circuit 15 to the temporary memory circuit 4 as shown in FIG. 4B. " エ* " is displayed at the display 1, and the kana keys are depressed to input another word " ジカン " (time), for example. Then, when the function keys such as the key [·] and the key [?] are depressed, the data thus input is compared with the data as shown in FIG. 4B which is in the word memory circuit 15. As a result of this comparison, the address X6 of the English word corresponding to " ジカン " (time) is read out and written in the temporary memory circuit 4. The input data is also compared with the data as shown in FIG. 4C which is stored in the sentence memory circuit 16, and the address 1 of item α for storing the sentences associated with " ジカン " (time) are read out and are also written in the temporary memory circuit (RAM) 4. When the search key [⊟] is subsequently depressed, the series of binary code signals corresponding to sentences with which the item α corresponding to " ジカン " (time) is "1" and the item β corresponding to " エ* " (station) is "101" are sequentially read out from the sentence memory circuit 16 and are written in the temporary memory circuit 4. These code signals are then sequentially decoded into sentences and displayed at the display 1 for search. When the key [En] is depressed when the desired sentence (for example, " イツキシャワトウチャクシマスカ ") is displayed during this search period, the corresponding English sentence ("What time does the train arrive at?") is displayed, thus completing the translation of a sentence based on a plurality of words as key words for search.

What I claim is:

1. An electronic translator capable of producing a sentence by using an entered word as a key word, said translator comprising:
   input means for entering a plurality of words;
   memory means comprising:
      means for storing words of a first language and memory address data for each said first-language word;
      means for storing words of a second language and memory address data for each said second-language word, the first and second languages being distinct from each other;
      means for storing sentences of the first language and memory address data associated therewith and associated with one or more first-language words; and
      means for storing sentences of the second language and memory address data associated therewith and associated with one or more second-language words, said second language sentences corresponding respectively to the sentences of the first language,
      wherein at least two first language words have a common memory address data associated therewith and associated with at least one common first language sentence;
   access controlling means for controlling access to said memory means, comprising:
      means for selecting and reading out upon input of a first-language word by said input means, first-language sentences associated with memory address data associated with said input first-language word;
      means for selecting and reading out upon input of either of said first-language words associated with the common memory address data, said at least one common first language sentence;
      means for selecting and reading out upon input of a plurality of first-language words, at least one first language sentence associated with memory address data comprising memory address data associated with each of said plurality of first-language words;

sentence translation instruction means for accessing the second-language sentence corresponding to a first-language sentence which a user of said translator wishes to translate, from among the first-language sentences read out by said access controlling means; and display means for displaying a first-language word entered by said input means and for displaying said first language sentences associated with memory address data associated with said input first-language word and selected and read out by said access controlling means.

2. An electronic translator according to claim 1, wherein said memory means further comprises means for storing a conversion table used to retrieve a word of a first-language stored in said memory means corresponding to each of the words of the second language stored in said memory means.

3. An electronic translator according to claim 1, wherein said first language and said second language are natural human languages.

4. An electronic translator capable of producing a sentence by using an entered word as a key word, said translator comprising:

input means for entering a plurality of words;
memory means comprising:
means for storing words of a first language and memory address data for each said first-language word;
means for storing words of a second-language and memory address data for each said second-language word, the first and second languages being distinct from each other;
means for storing sentences of the first language and memory address data associated therewith and associated with one or more first-language words; and
means for storing sentences of the second language and memory address data associated therewith and associated with one or more second-language words, said second language sentences corresponding respectively to the sentences of the first language,
wherein at least two first language words have a common memory address data associated therewith and associated with at least one common first language sentence;

reading out and selecting means for selecting, in response to entry of a first-language word via said input means, each of the stored first-language sentences associated with memory address data associated with the entered first-language word, and comprising:
means for reading out, if one first-language sentence has been selected, the selected first-language sentence;
means for reading out, if more than one sentence has been selected, each selected sentence one after another;
means for reading out, upon input of either of said at least two first-language words associated with the common memory address data, said at least one common first-language sentence;
means for reading out, upon input of a plurality of first-language words by said input means, at least one first-language sentence associated with memory address data comprising memory address data associated with each of said plurality of first-language words;

sentence translation instruction means for accessing the second-language sentence corresponding to a first-language sentence which a user of said translator wishes to translate, from among the first-language sentences read out by said reading out means; and display means for displaying a first-language word entered by said input means and for displaying a first language sentence read out by said reading out means.

5. An electronic translator capable of producing a sentence by using an entered word as a key word, said translator comprising:

input means for entering a plurality of words;
display means for displaying a word entered via said input means;
memory means comprising:
means for storing words of a first language and memory address data for each said first-language word;
means for storing words of a second language and memory address data for each said second-language word, the first and second languages being distinct from each other;
means for storing sentences of the first language and memory address data associated therewith and associated with one or more first-language words; and
means for storing sentences of the second language and memory address data associated therewith and associated with one or more second-language words, said second language sentences corresponding respectively to the sentences of the first language,
wherein at least two first language words have a common memory address data associated therewith and associated with at least one common first language sentences;

control means for controlling said memory means, comprising:
means for identifying and reading out, upon entry of a first-language word via said input means, first-language sentences, stored in said memory means and associated with memory address data associated with the entered first-language word, one after another for display by said display means;
means for identifying and reading out, upon input of either of said at least two first-language words associated with the common memory address data, said at least one common first-language sentence;
means for identifying and reading out, upon input of a plurality of first-language words by said input means, at least one first-language sentence associated with memory address data comprising memory address data associated with each of said plurality of first-language words; and sentence translation instruction means for accessing the second-language sentence corresponding to a first-language sentence which a user of said translator wishes to translate, from among the first-language sentences, displayed by said display means.

6. An electronic translator capable of producing a sentence by using an entered word as a key word, said translator comprising:

input means for entering a word;

memory means for storing words and sentences comprising:

- means for storing words of a first language and memory address data for each first-language word,
- means for storing words of a second language and memory address data for each second-language word, the first and second languages being distinct from each other, and
- means for storing sentences of the first-language and memory address data associated therewith and associated with one or more first-language words; and
- means for storing sentences of the second language and memory address data associated therewith and associated with one or more second-language words, said second language sentences corresponding respectively to the sentences of the first language,
- wherein at least two first language words have a common memory address data associated therewith and associated with at least one common first language sentence;

access control means for controlling access to said memory means, comprising:

- means for selecting and reading out, upon entry of a first-language word via said input means, first-language sentences associated with memory address data associated with said entered first-language word;
- means for selecting and reading out, upon input of either of said at least two first-language words associated with the common memory address data, said at least one common first-language sentence;
- means for selecting and reading out, upon input of a plurality of first-language words by said input means, at least one first-language sentence associated with memory address data comprising memory address data associated with each of said plurality of first-language words;

sentence translation instruction means for accessing the second-language sentence corresponding to a first-language sentence which a user of said translator wishes to translate, from among the first-language sentences read out by said access control means; and display means for displaying a first-language word entered by said input means and for displaying a sentence read out from said memory means by said access control means.

* * * * *

UNITED STATES PATENT AND TRADEMARK OFFICE
CERTIFICATE OF CORRECTION

PATENT NO. : 5,063,534
DATED : November 5, 1991
INVENTOR(S) : Juji Kishimoto

It is certified that error appears in the above-identified patent and that said Letters Patent is hereby corrected as shown below:

On the Title page, item

[56] REFERENCES CITED

At "U.S. PATENT DOCUMENTS"

"4,438,505 3/1984 Morimoto" should read -- 4,438,505 3/1984 Yanagiuchi --.
"4,551,818 11/1985 Ichiro Sado et al." should read -- 4,551,818 11/1985 Sado et al. --.
Insert -- 4,597,056 6/1986 Washizuka...... 364/419 --.
"4,623,985 11/1986 Yanagiuchi" should read -- 4,623,985 11/1986 Morimoto et al. --.

Title page.

[57] ABSTRACT

Line 10, "and" should read -- an --.
Line 12, "other," should read -- other --.

COLUMN 3

Line 29, "key" should read -- key En --.

COLUMN 4

Line 3, "display 22." should read -- display 1. --.

UNITED STATES PATENT AND TRADEMARK OFFICE
CERTIFICATE OF CORRECTION

PATENT NO. : 5,063,534
DATED : November 5, 1991
INVENTOR(S) : Juji Kishimoto

It is certified that error appears in the above-identified patent and that said Letters Patent is hereby corrected as shown below:

COLUMN 7

Line 19 "first-language" should read -- first language --.
Line 33 "second-language" should read -- second language--.
Line 44 "second language" should read -- second-language--.
Line 47 "first language" should read --first-language--.

COLUMN 8

Line 9 "reading out" should read -- reading-out --.
Line 13 "reading out" should read -- reading-out --.
Line 37 "second language" should read -- second-language --.
Line 40 "first language" should read -- first-language --.
Line 43 "first language sentences;" should read -- first-language sentence; --
Line 68 "sentences," should read -- sentences --.

UNITED STATES PATENT AND TRADEMARK OFFICE
CERTIFICATE OF CORRECTION

PATENT NO. : 5,063,534
DATED : November 5, 1991
INVENTOR(S) : Juji Kishimoto

It is certified that error appears in the above-identified patent and that said Letters Patent is hereby corrected as shown below:

COLUMN 9

Line 15 "first-language" should read -- first language --.
Line 22 "second language" should read -- second-language --.
Line 26 "first language" should read -- first-language --.
Line 29, "first language" should read -- first-language --.

Signed and Sealed this

Fifteenth Day of June, 1993

Attest:

MICHAEL K. KIRK

Attesting Officer

Acting Commissioner of Patents and Trademarks